United States Patent
Jeong et al.

(10) Patent No.: US 10,560,961 B2
(45) Date of Patent: Feb. 11, 2020

(54) METHOD FOR PROCESSING REQUEST THROUGH POLLING CHANNEL IN WIRELESS COMMUNICATION SYSTEM AND APPARATUS THEREFOR

(71) Applicant: LG ELECTRONICS INC., Seoul (KR)

(72) Inventors: Seungmyeong Jeong, Seoul (KR); Seongyun Kim, Seoul (KR); Hongbeom Ahn, Seoul (KR); Dongjoo Kim, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 15/579,414

(22) PCT Filed: Jan. 19, 2016

(86) PCT No.: PCT/KR2016/000535
§ 371 (c)(1),
(2) Date: Dec. 4, 2017

(87) PCT Pub. No.: WO2016/195199
PCT Pub. Date: Dec. 8, 2016

(65) Prior Publication Data
US 2018/0146497 A1 May 24, 2018

Related U.S. Application Data

(60) Provisional application No. 62/170,689, filed on Jun. 4, 2015, provisional application No. 62/191,488, filed on Jul. 12, 2015.

(51) Int. Cl.
*H04J 3/16* (2006.01)
*H04W 74/06* (2009.01)
(Continued)

(52) U.S. Cl.
CPC .......... *H04W 74/06* (2013.01); *H04L 43/103* (2013.01); *H04W 4/70* (2018.02); *H04W 74/002* (2013.01)

(58) Field of Classification Search
CPC ..... H04W 74/06; H04W 74/002; H04W 4/70; H04W 43/103
See application file for complete search history.

(56) References Cited

U.S. PATENT DOCUMENTS 8,929,267 B2   1/2015  Park et al.
2013/0179557 A1*  7/2013  Bian ................. H04L 41/00
                                            709/223
(Continued)

FOREIGN PATENT DOCUMENTS

WO   WO 2015/061290 A1   4/2015
WO   WO 2015/069038 A1   5/2015

OTHER PUBLICATIONS

Francesca Pacini (Performance of data serialization methods for wireless communications in resource-contrained devices, University of PISA, 2013/2014) (Year: 2014).*
(Continued)

*Primary Examiner* — Maharishi V Khirodhar
(74) *Attorney, Agent, or Firm* — Birch, Stewart, Kolasch & Birch, LLP

(57) ABSTRACT

A method for processing a request through a polling channel in a wireless communication system is provided according to one embodiment of the present invention. The method is performed by a first apparatus, and may comprise the steps of: transmitting to a second apparatus a retrieve response for a polling channel, including a first request which has been received from a third apparatus; receiving, from the second apparatus, a second request including a first response corresponding to the received first request; verifying whether a request identifier of the first response and a request identifier
(Continued)

of the received first request are the same or not; and if the request identifier of the first response and the request identifier of the received first request are the same, transmitting the first response to the third apparatus.

12 Claims, 12 Drawing Sheets

(51) Int. Cl.
    *H04W 4/70* (2018.01)
    *H04L 12/26* (2006.01)
    *H04W 74/00* (2009.01)

(56) References Cited

U.S. PATENT DOCUMENTS

| | | |
|---|---|---|
| 2014/0085485 A1 | 3/2014 | Gavita et al. |
| 2014/0215043 A1 | 7/2014 | Ryu et al. |
| 2014/0233514 A1 | 8/2014 | Lee et al. |
| 2014/0344269 A1* | 11/2014 | Dong ................. H04L 67/12 707/736 |
| 2015/0282221 A1* | 10/2015 | Foti ................... H04W 4/70 455/517 |
| 2016/0275190 A1* | 9/2016 | Seed .................. H04W 4/70 |

OTHER PUBLICATIONS

Jorg (Towards a standardized common M2M service Layer Platform: Introduction to oneM2M, IEEE,Jun. 2014). (Year: 2014).*
Recardo (Mobile healthcare on a M2M mobile system, Jul. 31, 2014) (Year: 2014).*
Katusic et al., "Universal Identification Scheme in Machine-to-Machine Systems," Proceedings of the 12th International Conference on Telecommunications, Zagreb, Croatia, Jun. 28, 2013, 8 pages.

* cited by examiner

METHOD FOR PROCESSING REQUEST THROUGH POLLING CHANNEL IN WIRELESS COMMUNICATION SYSTEM AND APPARATUS THEREFOR

CROSS REFERENCE TO RELATED APPLICATIONS

This application is the National Phase of PCT International Application No. PCT/KR2016/000535, filed on Jan. 19, 2016, which claims priority under 35 U.S.C. 119(e) to U.S. Provisional Application No. 62/170,689, filed on Jun. 4, 2015 and No. 62/191,488, filed on Jul. 12, 2015, all of which are hereby expressly incorporated by reference into the present application.

TECHNICAL FIELD

The present invention relates to a method for processing a request through a polling channel in a wireless system and apparatus therefor.

BACKGROUND ART

As the ubiquitous era is entered, M2M (machine to machine) communication technology is in the limelight. M2M communication technology is being studied by many standard development organizations (SDO) such as TIA, ATIS, ETSI, one M2M and the like.

M2M communication system may have resource oriented architecture (RQA) and an access to various resources may be efficient. The access may be provided for the same operation (e.g., write, read, delete, execute, etc.) for the various resources.

Meanwhile, in an IOT (internet of tings) communication environment including such M2M communication, if it is impossible to perform bi-directional communication due to NAT/firewall (network address translation/firewall), there are various solutions for solving it. To solve such a problem, provided is a polling mechanism provided by an IoT service platform. However, according to a current technology, it may happen that a response cannot be delivered to an initial requester.

DISCLOSURE OF THE INVENTION

Technical Task

The present invention intends to propose a method for processing a request through a polling channel.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of processing a request message through a polling channel in a wireless communication system, the method performed by a first device, the method including transmitting a retrieve response for a polling channel including a first request received from a third device to a second device, receiving a second request including a first response corresponding to the received first request from the second device, checking whether a request identifier of the first response is identical to a request identifier of the received first request, and if the request identifier of the first response is identical to that of the received first request, transmitting the first response to the third device.

Additionally or alternatively, the second request may include a Notify request targeting a child resource of a predetermined resource hosted by the first device.

Additionally or alternatively, the specific resource may be created by a request of the second device.

Additionally or alternatively, the method may further include checking whether the second device has created the predetermined resource hosted by the first device.

Additionally or alternatively, the method may further include declining the second request if it is checked that the second device did not create the predetermined resource hosted by the first device.

Additionally or alternatively, the method may further include receiving a retrieve request for the polling channel from the second device.

Additionally or alternatively, if a timestamp parameter is included in the first request received from the third device, the first response may be transmitted within a time corresponding to the timestamp parameter.

In another technical aspect of the present invention, provided herein is an apparatus configured to process a request message through a polling channel in a wireless communication system, the apparatus including a radio frequency (RF) unit and a processor configured to control the RF unit, wherein the processor is further configured to transmit a retrieve response for a polling channel including a first request received from a third device to a second device, receive a second request including a first response corresponding to the received first request from the second device, check whether a request identifier of the first response is identical to a request identifier of the received first request, and if the request identifier of the first response is identical to the request identifier of the received first request, transmit the first response to the third device.

Additionally or alternatively, the second request may include a Notify request targeting a child resource of a predetermined resource hosted by the first device.

Additionally or alternatively, the predetermined resource may be created by a request of the second device.

Additionally or alternatively, the processor may be configured to check whether the second device has created the predetermined resource hosted by the first device.

Additionally or alternatively, the processor maybe configured to decline the second request if it is checked that the second device did not create the predetermined resource hosted by the first device.

Additionally or alternatively, the processor may be configured to receive a retrieve request for the polling channel from the second device.

Additionally or alternatively, if a timestamp parameter is included in the first request received from the third device, the first response may be transmitted within a time corresponding to the timestamp parameter.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, if a request is received through a polling channel, a result from processing the request can be efficiently returned to an originator of the request.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
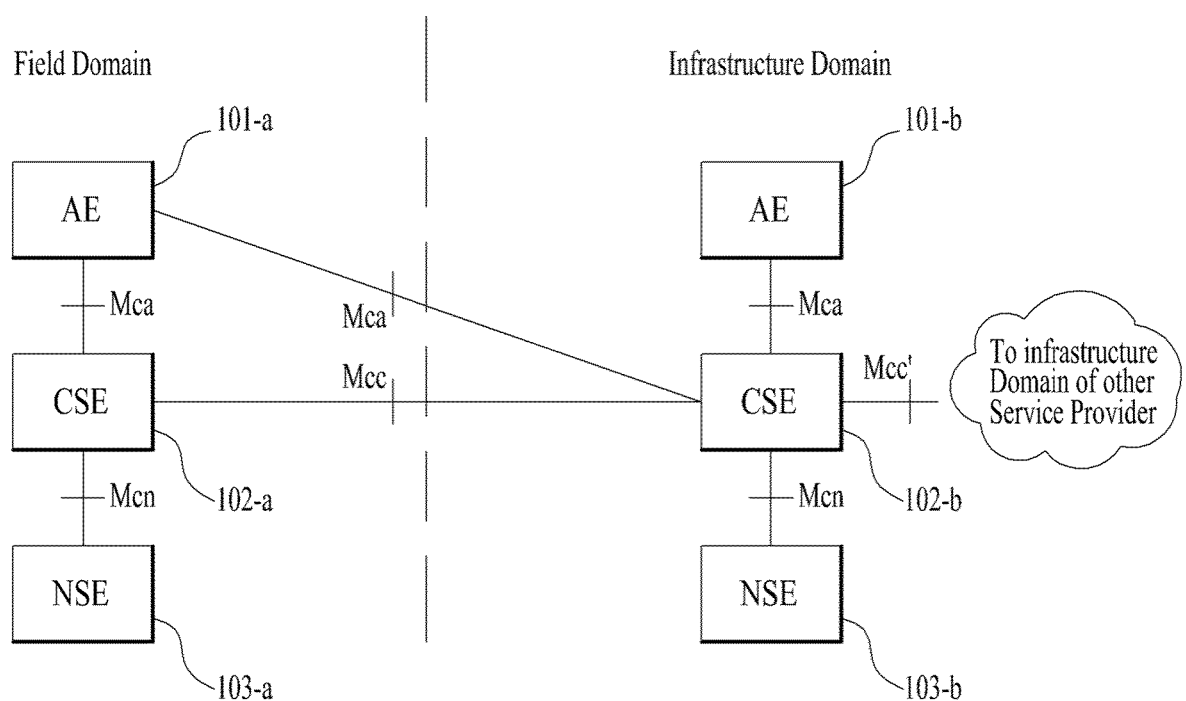
FIG. 1 shows a function structure in an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
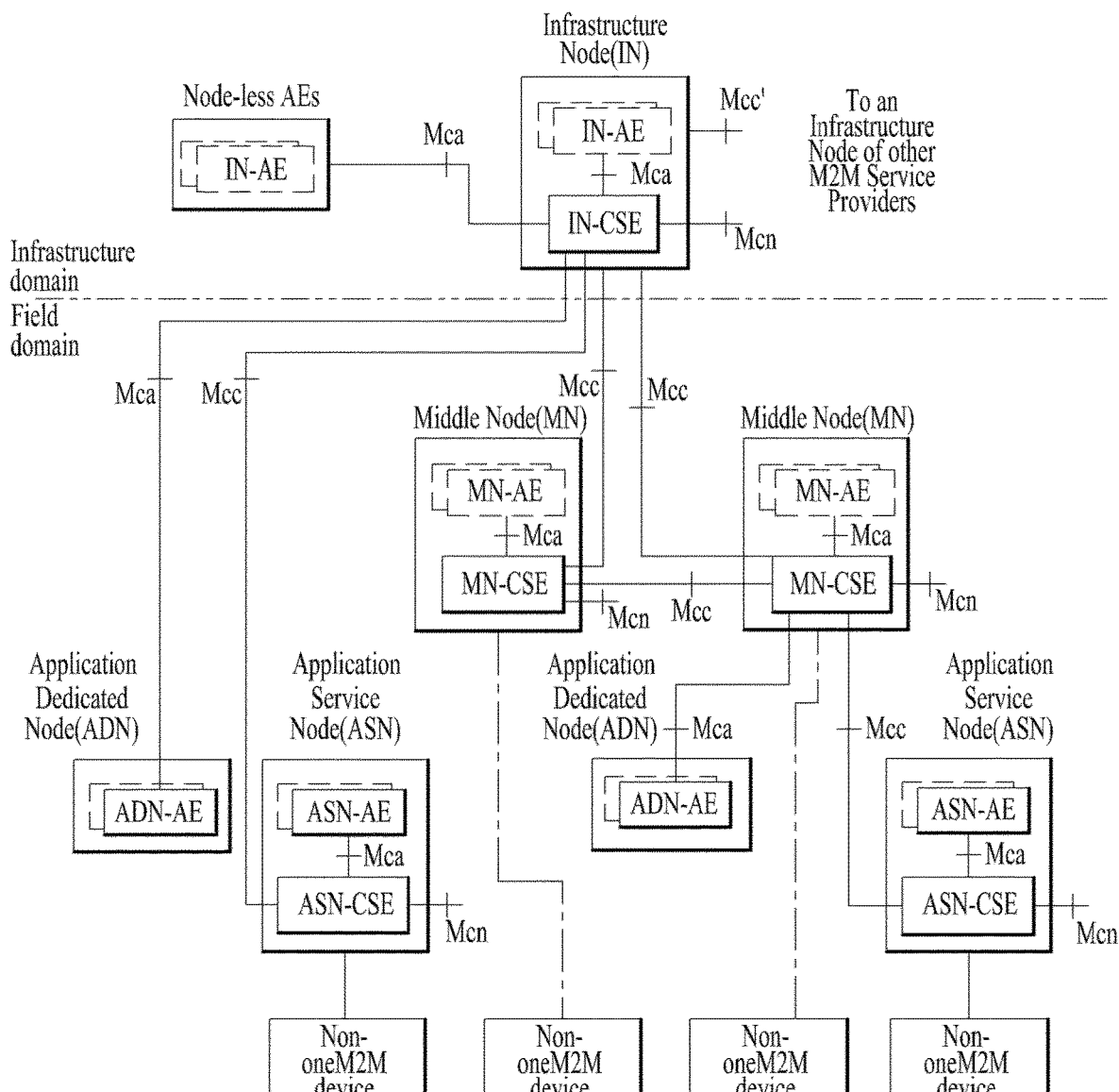
FIG. 2 shows a configuration supported by an M2M communication system based on an M2M function structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point.

The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
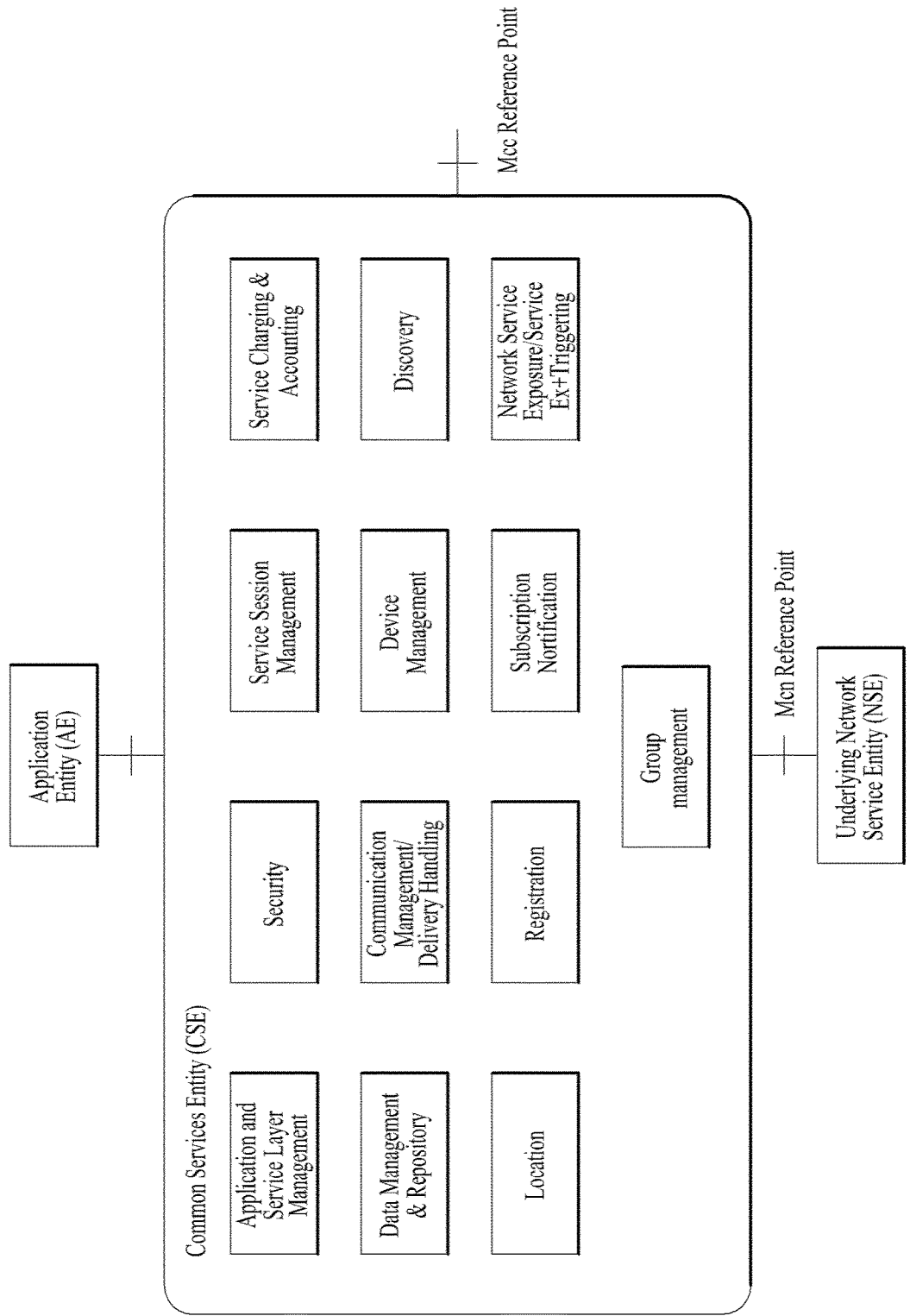
FIG. 3 shows a common service function provided in an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
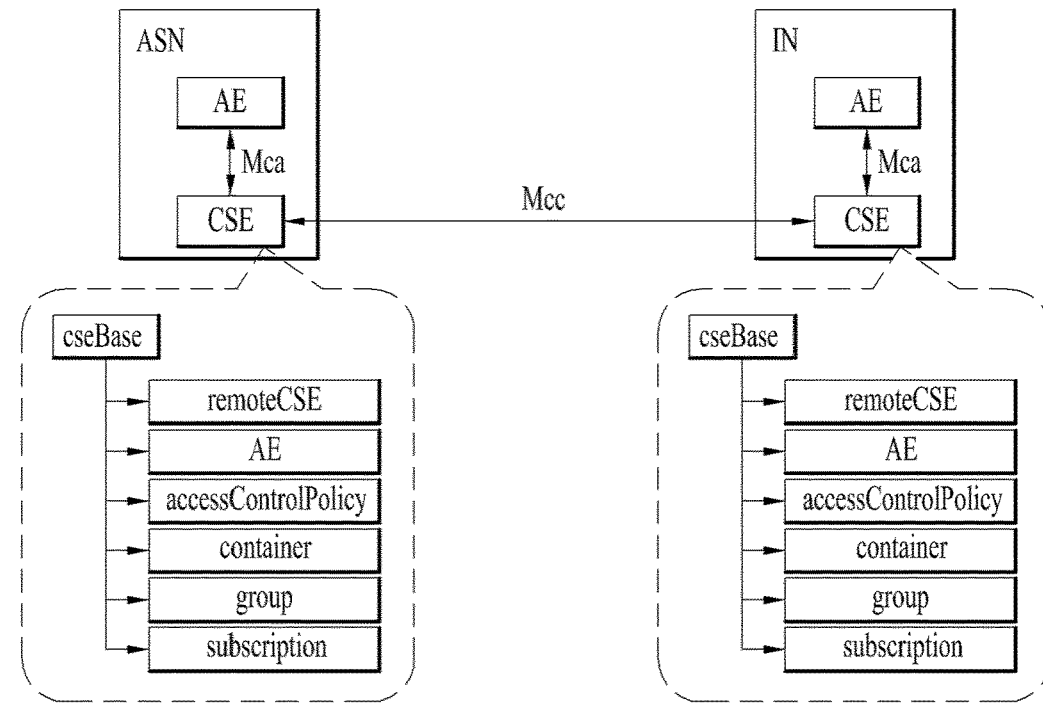
FIG. 4 shows a resource structure existing at an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlFolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
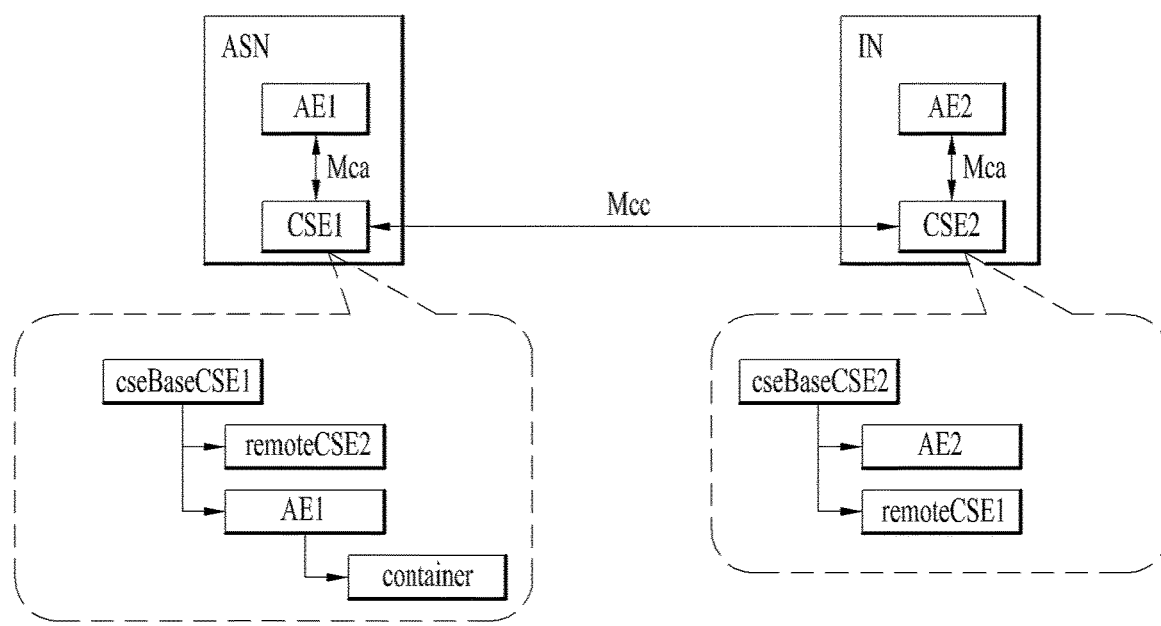
FIG. 5 shows a resource structure existing at an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
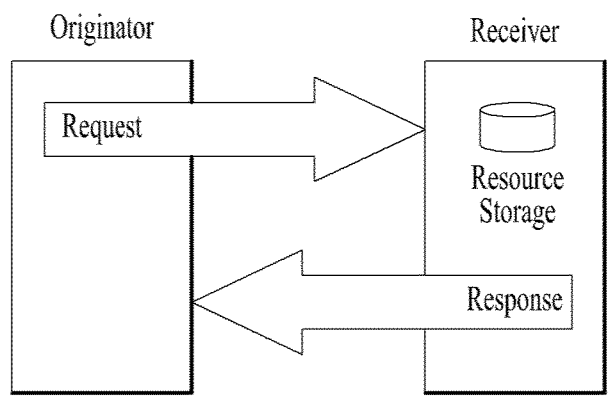
FIG. 6 shows a procedure for exchanging request and response messages used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Group Request Identifier parameter (identifier to prevent group fan-out request messages from being repeated)

Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message (so as to identify the ID of the request message).

rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, |

TABLE 1-continued

| Resource Type | Short Description | Child Resource Types | Parent Resource Types |
|---|---|---|---|
| | | | cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resource Type attribute. |
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource " . . . //example.com/oneM2M/myCSE", the value of the parentID attribute will contain " . . . //parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the |

TABLE 2-continued

| Attributes of <container> | Multiplicity | RW/RO/WO | Description |
|---|---|---|---|
| | | | hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The state Tag attribute of the parent resource should be incremented first and copied into this state Tag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |

TABLE 2-continued

| Attributes of <container> | Multiplicity | RW/RO/WO | Description |
|---|---|---|---|
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed.This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
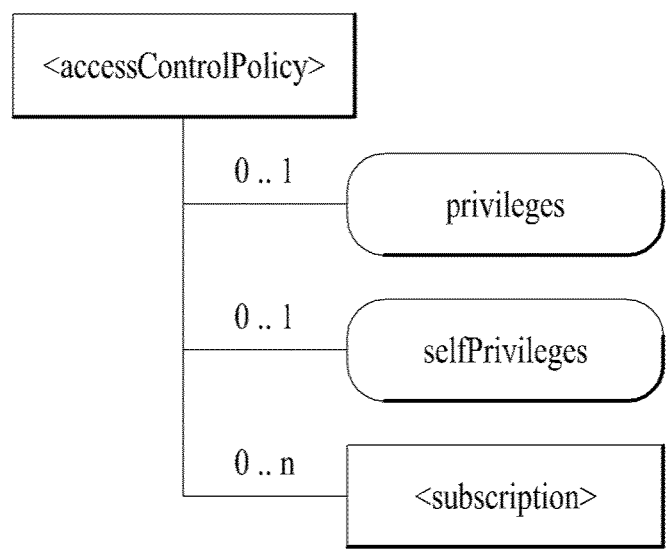
FIG. 7 shows a structure of <accessControlPolicy> resource.

FIG. 7 illustrates a structure of the <accessControlPolicy> resource. The following table shows attributes of the <accessControlPolicy> resource.

TABLE 3

| Attribute Name of <accessControlPolicy> | Multiplicity | RW/RO/WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (M) to the original resource. This is only for <accessControlPolicyAnnc>. |

TABLE 3-continued

| Attribute Name of <accessControlPolicy> | Multiplicity | RW/RO/WO | Description |
|---|---|---|---|
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 4

| Name | Description |
|---|---|
| originatorPrivileges | Refer to Table 5 |
| Contexts | Refer to Table 6 |
| operationFlags | Refer to Table 7 |

"originatorPrivileges" includes information shown in the following table.

TABLE 5

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 4 includes information shown in the widowing table.

TABLE 6

| Name | Description |
|---|---|
| Context | Defines the context in which every privileges of the present access control policy resource applies, e.g. time windows, location, and IP address. |

"operationFlags" in Table 4 includes information shown in the following table.

TABLE 7

| Name | Description |
|---|---|
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource.

Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
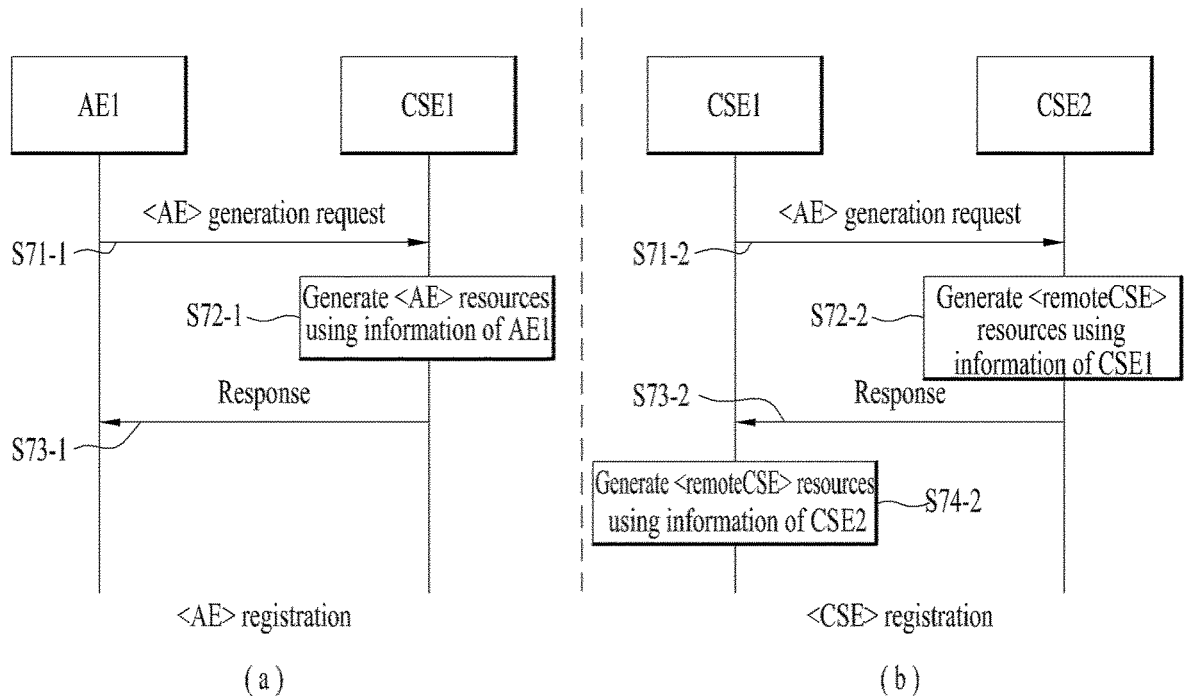
FIG. 8 shows a registration procedure in an M2M communication system.

FIG. 8 illustrates an AE registration procedure and a CSE registration procedure. FIG. 8(a) shows the AE registration procedure. AE1 that intends to perform registration sends a request for generation of <AE> resources to CSE1 corresponding to a registrar (S81-1). CSE1 can generate the <AE> resources using information of AE1 (S82-2). Then, CSE1 can send a response including a result of registration to AE1 (S83-2).

FIG. 8(b) illustrates the CSE registration procedure. The procedure of FIG. 8(b) corresponds to the procedure of FIG. 8(a) except that CSE1 corresponds to a registree, CSE2 corresponds to a registrar, and when CSE2 sends a result for a registration request of CSE1 (S83-2), CSE1 generates <remoteCSE> resources using information of CSE2 (S84-2).

Polling Channel Mechanism

Figure 9:
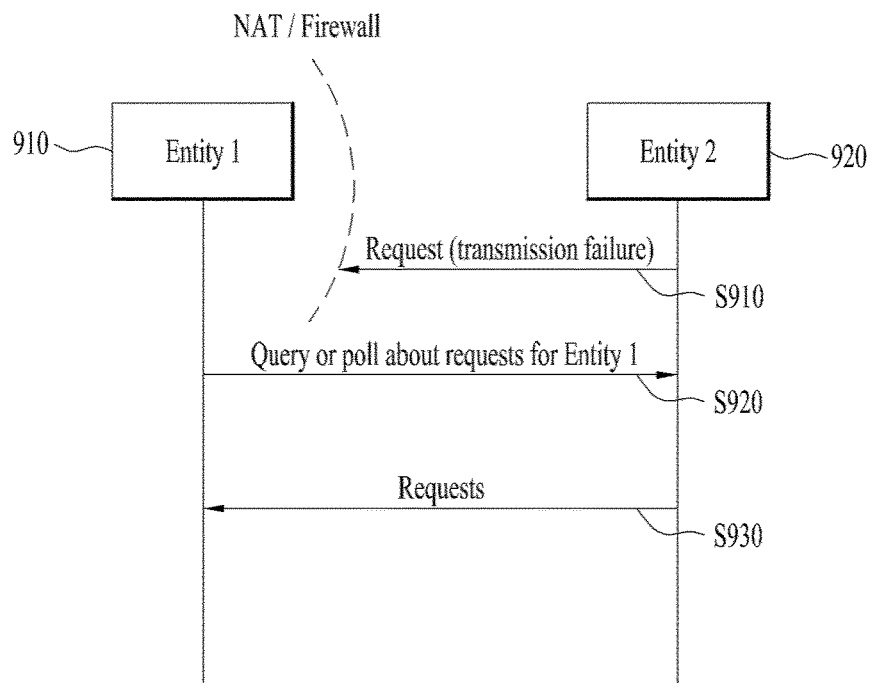
FIG. 9 describes a polling operation.

If restriction is put on external communication by NAT (network address translation) or firewall, poling can be used as one of solutions for resolving the restriction. For example, in FIG. 9, since an entity 1 910 is located within an NAT or firewall, it is in a situation that a request message sent by an entity 2 920 or the like is unable to directly access the entity 1 910. In this case, the entity 1 periodically asks whether there is a request message to be received by the entity 1 [S920]. If there is a request message to be received, the entity 1 receives it as a response to a corresponding request [S930].

Such a query, i.e., a polling can be classified into a short/long polling depending on a query period of the entity 1. In case of a short polling, if there is no request message for the entity 1, the entity 2 informs the entity 1 that there is no request message to deliver by immediately sending a response. Thereafter, the entity 1 should perform a short polling again at a random time. In case of a long polling, when a polling request of the entity 1 is received, if there is no request message to deliver, the entity 2 delays a response for a predetermined time and waits for a request, which is to be delivered to the entity 1, to arrive at the entity 2 itself. Thereafter, if the request arrives/occurs within the time, the entity 2 delivers it to the entity 1. Yet, if the request for the entity 1 fails to arrive/occur for the predetermined time, the entity 2 responds with an error. Thereafter, the entity 1 periodically performs a long polling again.

Figure 10:
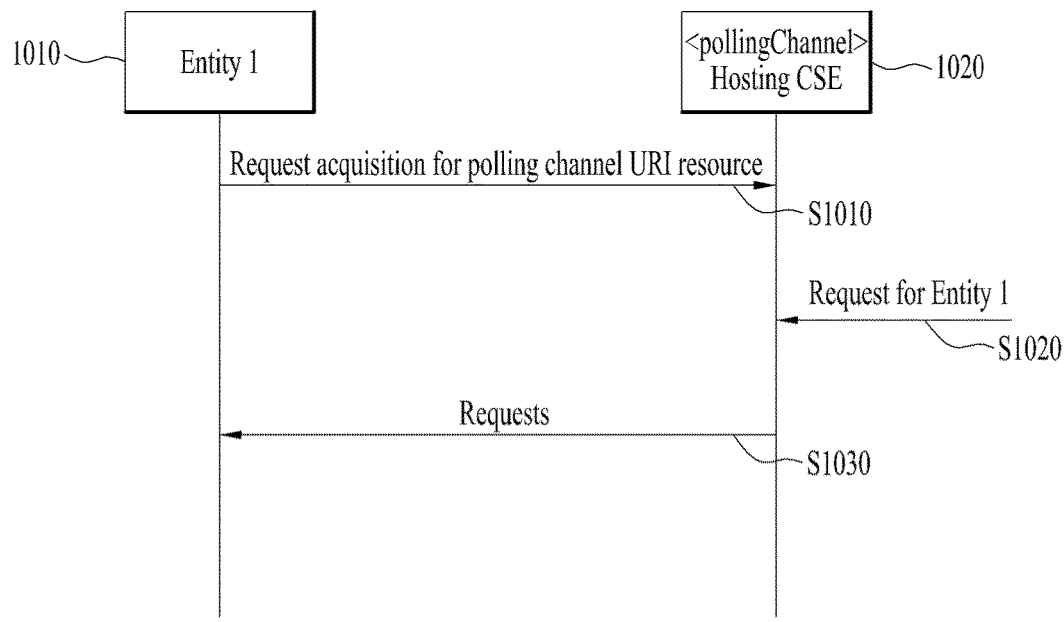
FIG. 10 describes a polling operation through a polling channel.

FIG. 10 shows a long polling scheme supported by one M2M. An entity 1 1010 creates a <pollingChannel> resource to perform a long polling at a hosting CSE 1020. Subsequently, the entity 1 performs a long polling by sending a retrieve request on a <pollingChannelURI> resource that is a child resource of the corresponding resource [S1010]. Thereafter, if a request message for the entity 1 is delivered within a predetermined time [S1020], the hosting CSE delivers a response message, in which the request message received in the step S1020 is contained, in response to the step S1010 [S1030].

Meanwhile, in FIG. 10, the entity 1 can create the <pollingChannel> resource after finishing a registration at the hosting CSE. Hence, the entity 1 and the hosting CSE are a registree and a registrar, respectively.

In the present specification, an originator refers to an entity (AE or CSE), a device, or the like, which sends a request. A receiver refers to an entity (AE or CSE), a device, or device designated as a receiver of the request. And, the receiver may be referred to as a target. Moreover, an entity and a device are interchangeably usable.

Blocking/Non-blocking Communication Method

First of all, oneM2M is based on a message exchange model that exchanges a request and a respond between an originator and a receiver like a sort of server/client. When an originator sends a request, a method for receiving a response (a request processed result) can be indicated as a parameter 'Response Type'. Through this parameter, the originator can indicate whether to stand by until receiving a processing result [i.e., blocking mode] or whether to receive a processing result thereafter without standing by for a request processed time after acknowledgement [non-blocking mode].

Figure 11:
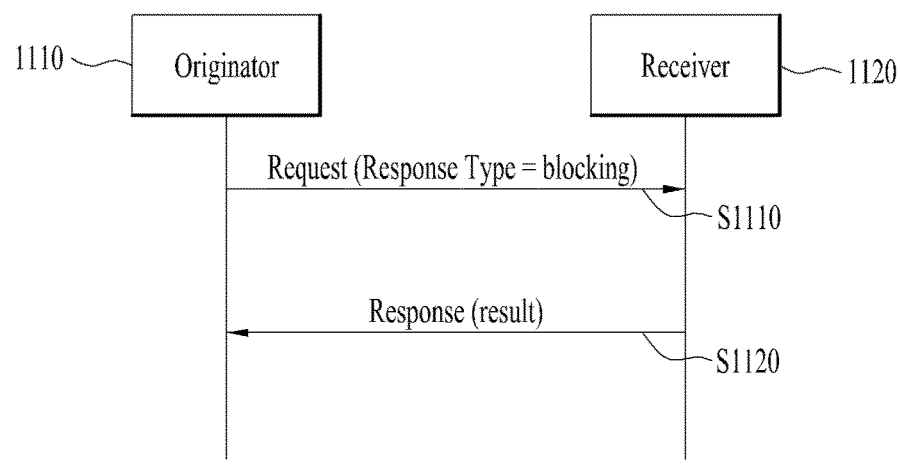
FIG. 11 shows a request and response transceiving procedure according to a response type.

FIG. 11 shows an operation according to a blocking mode. When a request of 51110 contains a parameter 'Response Type', if this value indicates a blocking, the following operation is performed. A receiver 1120 delays a response of S1120 until the request is processed. Thereafter, after completion of the request processing, the receiver sends a response like S1120. In this case, a request processing result is included.

A default value of the parameter 'Response Type' is a blocking. Even if this parameter is not included in each of the request messages S1210-a and S1210-b, the receiver responds in this blocking mode.

Figure 12:
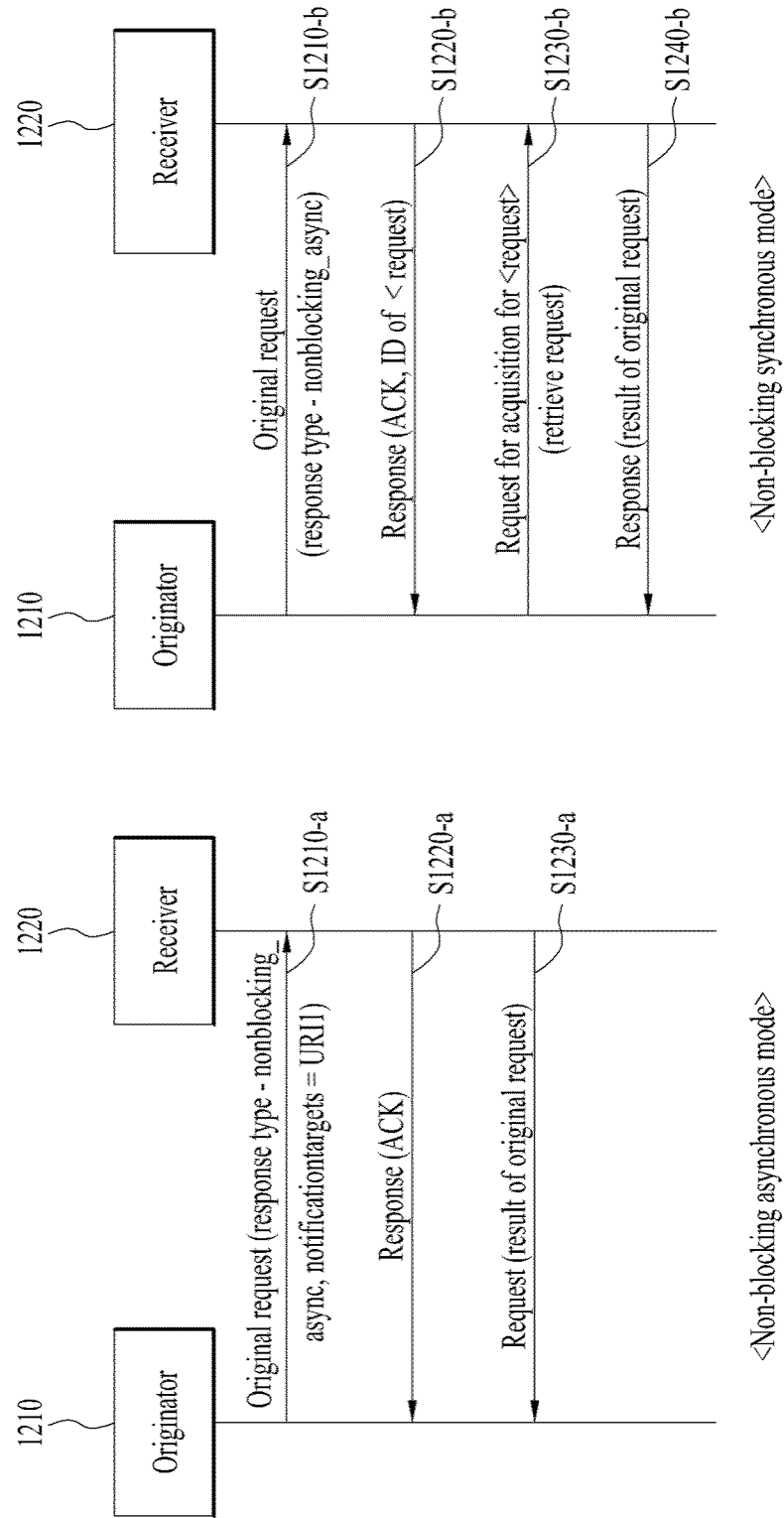
FIG. 12 shows a request and response transceiving procedure according to an asynchronous mode.

FIG. 12 shows an operation process in non-blocking mode. If an originator 1210 sends a value of a parameter 'Response Type' desiring to receive a result in non-blocking mode in sending a request message, a receiver 1220 immediately sends ACK (acknowledgement) for a message reception to the originator in case of receiving the request message [S1220-1, S1220-b]. Hence, unlike the blocking mode, if the originator indicates to receive the non-blocking mode in S1210-a or 1210-b, the originator only needs to stand by for a short time of receiving the ACK of S1220-a or S1220-b. Thereafter, the originator receives a final result.

The non-blocking mode can be classified into an asynchronous mode and a synchronous mode depending on a method of delivering a final result. When the receiver can send a message for sending a final result to the originator (i.e., when the originator can receive the corresponding message from the receiver in direct), an asynchronous mode is used. Otherwise, a synchronous mode is used. To indicate this, a parameter 'Response Type' may have a value indicating a non-blocking asynchronous mode or a non-blocking synchronous mode.

Like a left part of FIG. 12, in an asynchronous mode, the receiver delivers a final result to the originator through a separate request message in S1230-a. Namely, it means that the receiver can successfully send an unsolicited message to the originator. In S1210-a, the originator can set an address information (notification target) from which the final result is intended to be received like S1230-a. This address may include a plurality of unsolicited addresses from which the originator intends to receive the result. The example of FIG. 2 assumes that URI1 is an address from which the originator receives the final result. Moreover, the receiver creates a <request> resource after receiving the request of S1210-a, stores the corresponding request and a processing result, and is able to deliver an address information of the <request> resource to the originator in S1220-a. In this case, the originator may selectively operate as a synchronous mode after S1220-a.

Since the originator is unable to receive an unsolicited message from the receiver in the synchronous mode unlike the asynchronous mode, it performs an operation of retrieving a final result from the receiver. This corresponds to S1230-b in the right part of FIG. 12. The originator should have the corresponding information to acquire the processing result in S1230-b, which is created as a <request> resource by the receiver for itself after S1210-b. And, information on this resource is carried on ACK sent to the originator in S1220-b. Hence, the final result of the request message of S1210-b is delivered through a response message of S1240-b.

The definition of the parameter 'Response Type' is described as follows.

'Response Type': Optional response message type. This type indicates that a response of a prescribed type should be sent for a previously sent request and also indicates when the response should be sent to the originator.

Non-blocking synchronous: If a request is accepted by a receiver (e.g., a receiver CSE or device), the receiver responds with an acknowledgment that confirms that the receiver will process the request in addition after the acceptance. A reference usable to access a status of the request and a result of an operation requested later is contained in the response to the accepted request by the receiver.

Non-blocking asynchronous: if a request is accepted by a receiver, the receiver should respond with acknowledgement that confirms that the receiver will process the request after the acceptance. A result of a requested operation needs to be sent to notification target(s) optionally provided within this parameter as a list of entities. If a notification target is not provided, the result needs to be sent as notification(s) to an originator.

Blocking: If a request is accepted by a receiver, the receiver responds with a result of a requested operation after completion of the requested operation.

Example of 'Response Type' set to non-blocking synchronous: An originator optimized to minimize communication time and energy consumption expresses a request to a receiver and desires to obtain acknowledgement about whether the request is accepted. Thereafter, the originator switches to a low power consumption mode and is then able to obtain a result of an operation requested thereafter.

Additional example of 'Response Type' set to non-blocking synchronous: If a result content is extremely large or a result is configured with a plurality of content parts of a target group, it can be asynchronously aggregated through time.

Moreover, a <request> resource type is described.

A use of a <request> resource type is optional by depending on settings.

Creation of the <request> resource can be performed on a receiver CES if a registree AE or a registree/registrar CSE target a random resource type or sends a request to a receiving CSE requesting a notification. Creation of a <request> resource instance is allowed by a receiver CSE as a result of a request, which contains a 'Response Type' parameter set to non-blocking synchronous or non-blocking asynchronous, from an originator.

If the result requests the originator to initiate an operation available for up to a reference (Request Expiration Timestamp information of the request set to non-blocking synchronous or non-blocking asynchronous), the receiver CSE having directly received the request from the originator should provide a reference of the created <request> resource to the originator again, whereby the originator can access attributes of the <request> resource to obtain a result of an operation that consumes a longer time thereafter. If the receiver CSE uses resources of the <request> type to maintain such context information, a reference that should be returned to the originator as a part of acknowledgement is an address of the <request> resource. The originator (or, a random entity authenticated solely depending on an access control) accesses a request status and is then able to access a requested operation result through it.

If an expiration time of the <request> resource expires, the <request> resource may be deleted by a CSE that hosts it. Thus, after the expiration time of the <request> resource has expired, it is not able to make an assumption that a specific <request> resource is still accessible. Depending on implementation of a CSE that hosts the <request> resource, if a result of the requested operation is sent again to the originator, the <request> resource may be deleted earlier than the expiration time.

In order to provide a standardized structure to express and access a context of a previously issued request, a <request> resource type is defined. A parent resource of a <request> resource should be <CSEBase> resource of a hosting CSE. The following table describes attributes of the <request> resource in part.

TABLE 8

| Attributes of <request> | Multiplicity | RW/RO/WO | Description |
|---|---|---|---|
| expirationTime | 1 | RW | A value of expirationTime is selected by a CSE depending on Request Expiration Timestamp, Result Expiration Timestamp, Result Persistence and Operation Execution Time parameters associated with an original request. |
| operation | 1 | RO | This includes a value of an operation parameter of an original request message. |
| target | 1 | RO | This includes a value of a To parameter of an original request message. |
| originator | 1 | RO | This includes a value of From parameter of an original request message. |

TABLE 8-continued

| Attributes of <request> | Multiplicity | RW/ RO/ WO | Description |
|---|---|---|---|
| requestID | 1 | RO | This includes a value of a Request Identifier parameter of an original request message. |
| metaInformation | 1 | RO | Meta information on request |
| content | 1 | RO | This includes a value of a Content parameter of an original request message |
| requestStatus | 1 | RO | This includes information on a current status, e.g., "Accepted and pending". |
| operationResult | 1 | RO | This includes a result of an originally requested operation, which matches a Result Content parameter associated with an original request. |

All operations for <request> resources except CREATE operations are controlled by an access control policy.

Hereinafter, a polling procedure using a <pollingChannel> resource is described. First of all, described are a <pollingChannel> resource type and a <pollingChannelURI> resource type that is a child resource of the <pollingChannel> resource type.

The <pollingChannel> resource represents a channel that can be used for a request-unreachable entity (i.e. an AE or a CSE which is behind NAT so it cannot receive a request from other Nodes). The request-unreachable entity creates a <pollingChannel> resource on a request-reachable CSE, and then polls any type of request(s) for itself from the <pollingChannel> Hosting CSE (that is, the CSE which has or hosts the <pollingChannel> resource). For example, an AE can retrieve notifications by long polling on the channel when it cannot receive notifications asynchronously from a subscription Hosting CSE.

The <pollingChannelURI> virtual resource is the child resource of the <pollingChannel> resource and is used to perform service layer long polling. The creator of the <pollingChannel> resource sends a Retrieve request targeting the <pollingChannel URI> resource as a service layer long polling request. The long polling request of the other entities except the creator, shall be rejected. The response to the long polling request shall be pending until there are any requests received on the channel.

Re-targeting Requests Through Polling Channel

A request targeting a request-unreachable AE/CSE can be re-targeted through the <pollingChannel>. When a <pollingChannel> Hosting CSE receives a request to the request-unreachable AE/CSE, it internally re-targets the request to the <pollingChannel> of the AE/CSE.

It is assumed that the request-unreachable AE/CSE already set its requestReachability attribute as FALSE and created the <pollingChannel> resource. If there is no <pollingChannel> for the entity and requestReachability is FALSE, re-targeting is not performed. Re-targeted requests shall be transmitted to its target entity when it performs Long Polling on its <pollingChannel> resource.

Long Polling Through Polling Channel

A request-unreachable entity can poll requests through a polling channel. Once the Originator starts Long Polling on a polling channel by sending a RETRIEVE request, the Receiver who is the <pollingChannel> Hosting CSE holds the request until it has any requests to return to the Originator. If the request expires and there's no available request to return, the Receiver shall send the response to inform the Originator that a new polling request should be generated again.

Figure 13:
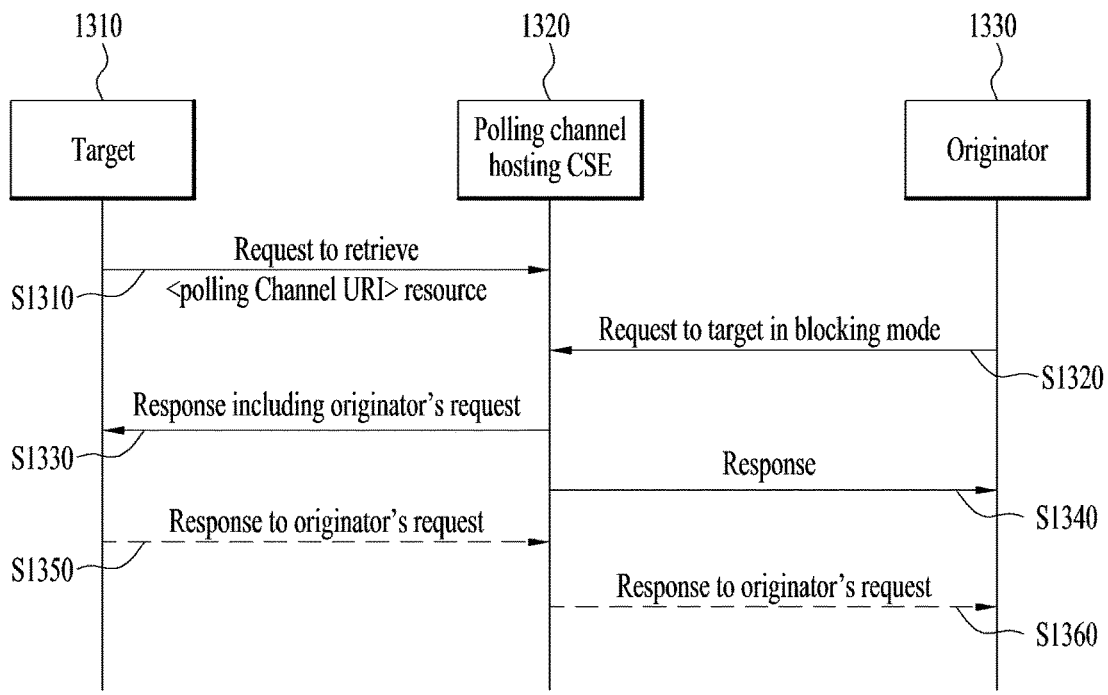
FIG. 13 shows a polling operation through a polling channel according to a related art.

FIG. 13 shows a procedure for responding to a request through a long polling according to a related art. A target 1310 sends a request for retrieving a <pollingChannelURI> resource to a <pollingChannel> hosting CSE 1320 [S1310]. The <pollingChannel> hosting CSE then receives a request for the target in blocking mode from an originator 1330 [S1320]. Hence, the <pollingChannel> hosting CSE can send a response including the originator's request [S1330].

A long polling through the aforementioned <pollingChannel> resource fails to clearly state a step S1340 of sending a response message in response to the originator's request in FIG. 13. Since the <pollingChannel> hosting CSE receives the request from the originator in S1320, it may be able to anticipate that a response will be sent like S1340. Yet, this means that S1350 should precede S1340.

Moreover, in order for the target to send a response message like S1350, a response (a result from processing the request message received from the originator) should be sent in form of a request message. Yet, a target (resource) for sending this request message is not clearly stated.

Moreover, the <pollingChannel> hosting CSE should be able to deliver the processing result received in S1350 to the originator in form of a response message like S1340 or S1360. Yet, it is unable to guarantee whether the request sent by the originator is set to a blocking mode or a non-blocking mode for waiting for a response message for an enough time in S1320. Namely, in case of delivering a request in blocking mode through a polling channel, it should be operational in non-blocking mode.

To solve the above problems, the present specification proposes a procedure for a <pollingChannel> hosting CSE to process an originator's blocking mode into non-blocking and a procedure for a target to deliver a new request message to the <pollingChannel> hosting CSE to send a response message in response to an originator's request obtained through a long polling.

Although the present specification is described with reference to a long polling through <pollingChannel> resource and <pollingChannelURI> resource, if these resources are used by being extended to a short polling, the present specification is exactly usable as a description for sending a response to a request obtained through a short polling.

Although the present specification describes that an originator is an entity having created a request and that a target is an entity receiving to process the request, the originator may be extended to apply as an entity capable of sending or forwarding a request message to a <pollingChannel> hosting CSE instead of being limited to an entity creating to send a request message initially. Likewise, the target may be extended to apply as an entity receiving a request message through <pollingChannel> despite not being a final reception target as well as a target entity finally receiving the request message.

Figure 14:
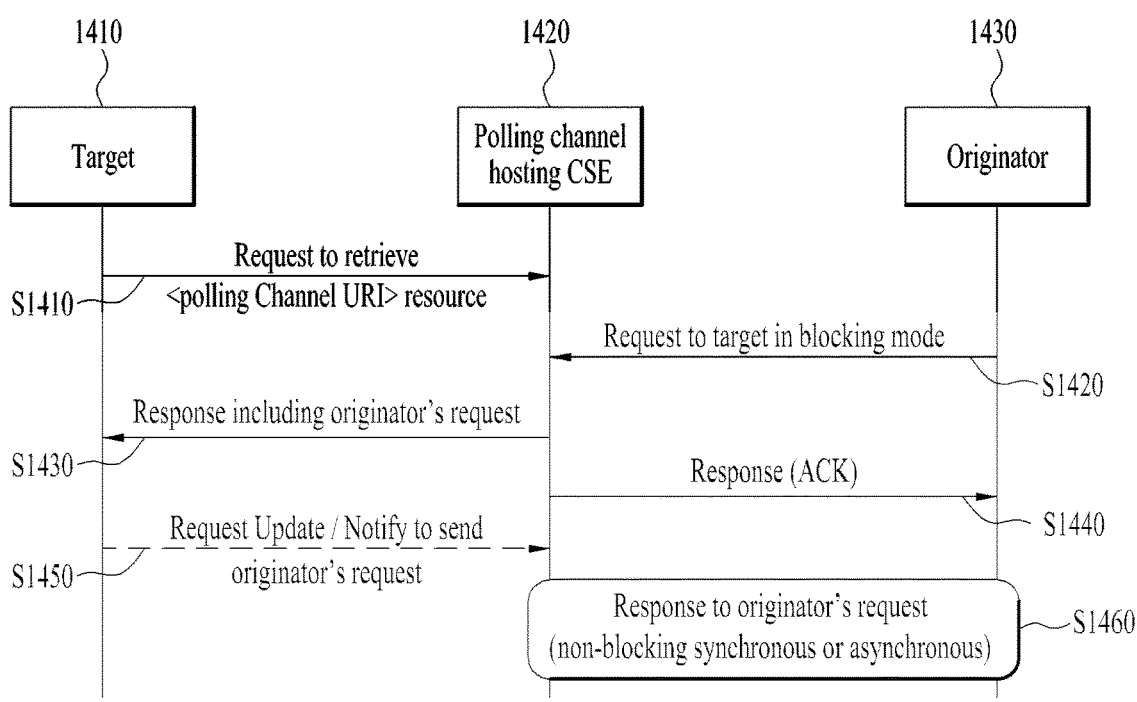
FIG. 14 shows a polling operation according to one embodiment of the present invention.

FIG. 14 shows a method of receiving and processing a request through <pollingChannel> according to one embodiment of the present invention.

Since S1410 is identical as described in FIG. 13, its description shall be omitted.

If a <pollingChannel> hosting CSE 1420 delivers a request in blocking mode of S1420 through a polling channel retrieve response message, it is able to deliver a response created by a target 1410 to an originator 1430 in 2 ways. A first way is a method of returning a response in non-blocking mode like S1440 and S1460. And, a second way is a method of returning a response in blocking mode like S1460.

A case for the <pollingChannel> hosting CSE to return a response in non-blocking mode can be classified into two kinds. A first kind is a case that the originator specifies an existing/related art blocking mode. And, a second kind is a case that the originator specifies a changeable/negotiable blocking mode. The changeable blocking mode means that the <pollingChannel> hosting CSE switches to a non-blocking mode and then sends a corresponding response despite the originator specifies a blocking. In both cases, information indicating that it is switched to the non-blocking mode can be contained in the response sent in S1440. If a <request> resource is created in non-blocking mode, information on the corresponding resource may be included.

[Method of Replying in Non-blocking Mode]

Although the originator specifies an existing blocking mode or a changeable blocking mode in a request message, the <pollingChannel> hosting CSE returns ACK for the request message in S1440 by switching to a non-blocking mode and is then able to deliver a final result in S1460. This may be operational when a target is estimated to send a response of S1450 late according to a determination of the <pollingChannel> hosting CSE. For example, this corresponds to a case that an operation execution time or a response expiration timestamp included in an originator's request message is set long enough or not, or the like. Or, the <pollingChannel> hosting CSE may unconditionally switch to the non-blocking mode in case of delivering a request message through a polling channel without a determining process.

In case of responding by switching to the non-blocking mode, the <pollingChannel> hosting CSE may select a non-blocking synchronous or asynchronous mode according to the originator's information obtained by the <pollingChannel> hosting CSE. For example, the <pollingChannel> hosting CSE may acquire information such as requestReachability from <AE> or <remoteCSE> resource corresponding to an originator among resources of its own or information such as requestReachability from <CSEBase> resource of an originator if originator is CSE; if the originator is able to receive an asynchronous (unsolicited) request, the <pollingChannel> hosting CSE may use a non-blocking asynchronous mode; otherwise, the <pollingChannel> hosting CSE may use a non-blocking synchronous mode. Moreover, if the <pollingChannel> hosting CSE does not support <request> resource, it is able to use a non-blocking asynchronous mode.

[Method of Replying in Blocking Mode]

If the <pollingChannel> hosting CSE operates in blocking mode as specified in an originator's request message, it is able to respond with a final result not through S1440 but through S1460. If a parameter such as Result Expiration Timestamp is included in the request message of S1420 by the originator, the <pollingChannel> hosting CSE waits for a reception of a processing result message from the target of S1450 until the corresponding time and is then able to forward it to the originator. If the target fails to forward the processing result to the <pollingChannel> hosting CSE by the corresponding time, the <pollingChannel> hosting CSE can deliver an error message such as 'TIMEOUT' to the originator.

S1430 and S1450 are described in detail as follows.

In order for the target to forward a response message to the <pollingChannel> hosting CSE in response to an original request (i.e., the originator's request) in FIG. 14, a new request message should be sent. And, a target of the new request can use resources as follows.

[Method of Using <Request> Resource]

If the <pollingChannel> hosting CSE creates <request> resource by an operation of switching to a non-blocking mode, the corresponding resource information (address or ID) is provided in S1430. To this end, additional information can be included in the response message of S1430 by the <pollingChannel> hosting CSE. Thereafter, the target can deliver a new request message for delivery of the final result (i.e., a processing result for the original request) of S1450 by an Update or Notify operation for the <request> resource according to the additional information included in the response message of S1430. For example, it is able to use an Update operation request message capable of changing operationResult and requestStatus attribute values of the <request> resource.

[Method of Using <CSEBase> Resource]

If the <request> resource is not created by the <pollingChannel> hosting CSE, the <pollingChannel> hosting CSE can provide information of a resource (e.g., <CSEBase> resource) indicating the <pollingChannel> hosting CSE in S1430. The corresponding information is provided in S1430. Or, if the corresponding information is not provided, the target can send the processing result on the <CSEBase> resource through a Notify operation request message. In this case, since attribute information capable of storing the result is not in the corresponding resource, the request message of S1450 contains information that can be mapped to the polling (S1410 or S1430) of the target or the originator's request (S1420). Through this, the <pollingChannel> hosting CSE can send the processing result contained in the message received through S1450 to the originator through S1460.

Of course, for a case of creating the <request> resource, it is able to use a method of using a <CSEBase> resource. When the <pollingChannel> hosting CSE receives the processing result, the <request> resource can be updated with the processing result.

[Method of Using <pollingChannel> and <pollingChannelURI> Resources]

If it is processed into a blocking mode by the <pollingChannel> hosting CSE or the <request> resource is not created in non-blocking asynchronous mode, the target may send a processing result on a <pollingChannelURI> virtual resource that is a child resource of the <pollingChannel> resource. The <pollingChannelURI> resource is a resource for an existing target to perform a polling. The <pollingChannelURI> resource is created as soon as the <pollingChannel> resource that is a parent resource is created. Hence, while a polling is performed, the <pollingChannelURI> resource can be accessed by the target at any time. Moreover, regarding the access authority to the <pollingChannelURI> resource, only the target can access the <pollingChannelURI> resource like the <pollingChannel> resource. Hence, a resource, which carries a processing result by targeting the <pollingChannelURI> resource, is always accepted/granted by the <pollingChannel> hosting CSE. The result can be delivered as a body/payload (content request parameter) of the corresponding message using such an operation request message (e.g., Create/Update/Notify) for the virtual resource.

This method can be advantageously operated even if the <pollingChannel> hosting CSE fails to create or is unable to create the <request> resource. Compared to the above method of using the <CSEBase> resource, this method is advantageous in that mapping to an initial request of the originator is facilitated in case of receiving a long polling result from a plurality of targets that will be simultaneously processed from the view points of the <pollingChannel> hosting CSE.

Of course, this method is usable in case of creating a <request> resource. If the <pollingChannel> hosting CSE receives a processing result, the <request> resource can be updated with the processing result.

In the following description, a procedure for performing an embodiment of the present invention shall be described from the point of view of each of the target and the <pollingChannel> hosting CSE.

Figure 15:
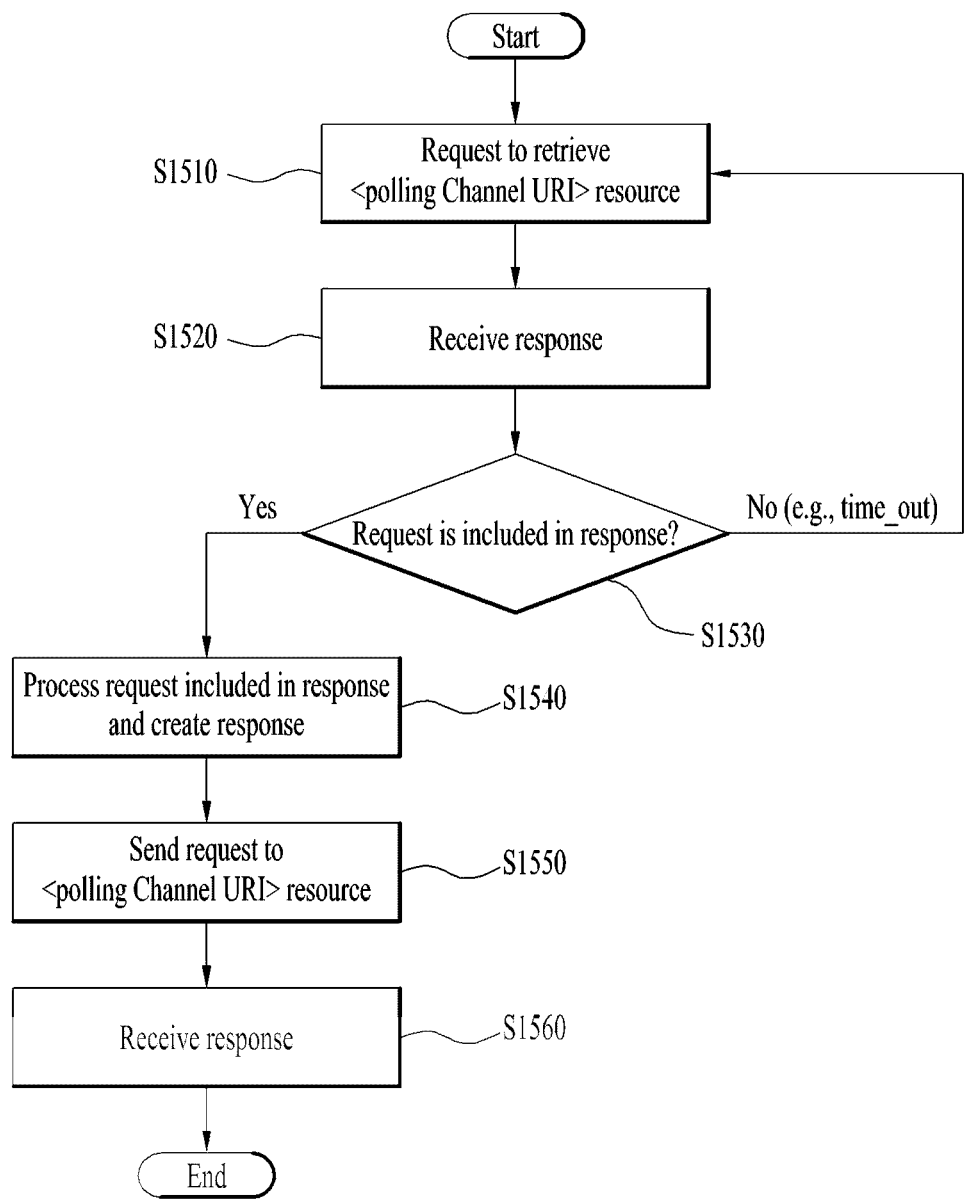
FIG. 15 shows a polling operation according to one embodiment of the present invention.

FIG. 15 shows a procedure performed by a target.

The target can send a retrieve request (Request 1) for performing a polling on a <pollingChannelURI> resource of the <pollingChannel> hosting CSE [S1510]. In this case, a payload of the retrieve request (message) is empty.

The target can receive a response (Response 1) from the <pollingChannel> hosting CSE [S1520]. The target can check whether a request (Request 2) of the originator is contained in the received response [S1530]. If the received response indicates a polling timeout, the target may perform the polling request of S1510 again.

If the originator's request (Request 2) is contained in the response received in S1530, the target processes the originator's request and is able to create a response (Response 2: this will be contained in Request 3 later) to the processed request. In doing so, the target sets Request ID of the response to the same as Request ID of the Request 2. Namely, the Request ID of the response 2 is identical to that of the Request 2.

The response (Response 2) created in S1540 is contained in a Notify (Or, Create/Update other than Retrieve) request (Request 3) for <pollingChannelURI> resource by the target. And, the target can send it to the <pollingChannel> hosting CSE [S1550].

Thereafter, the target can receive a response to the Request 3 from the <pollingChannel> hosting CSE [S1560].

Figure 16:
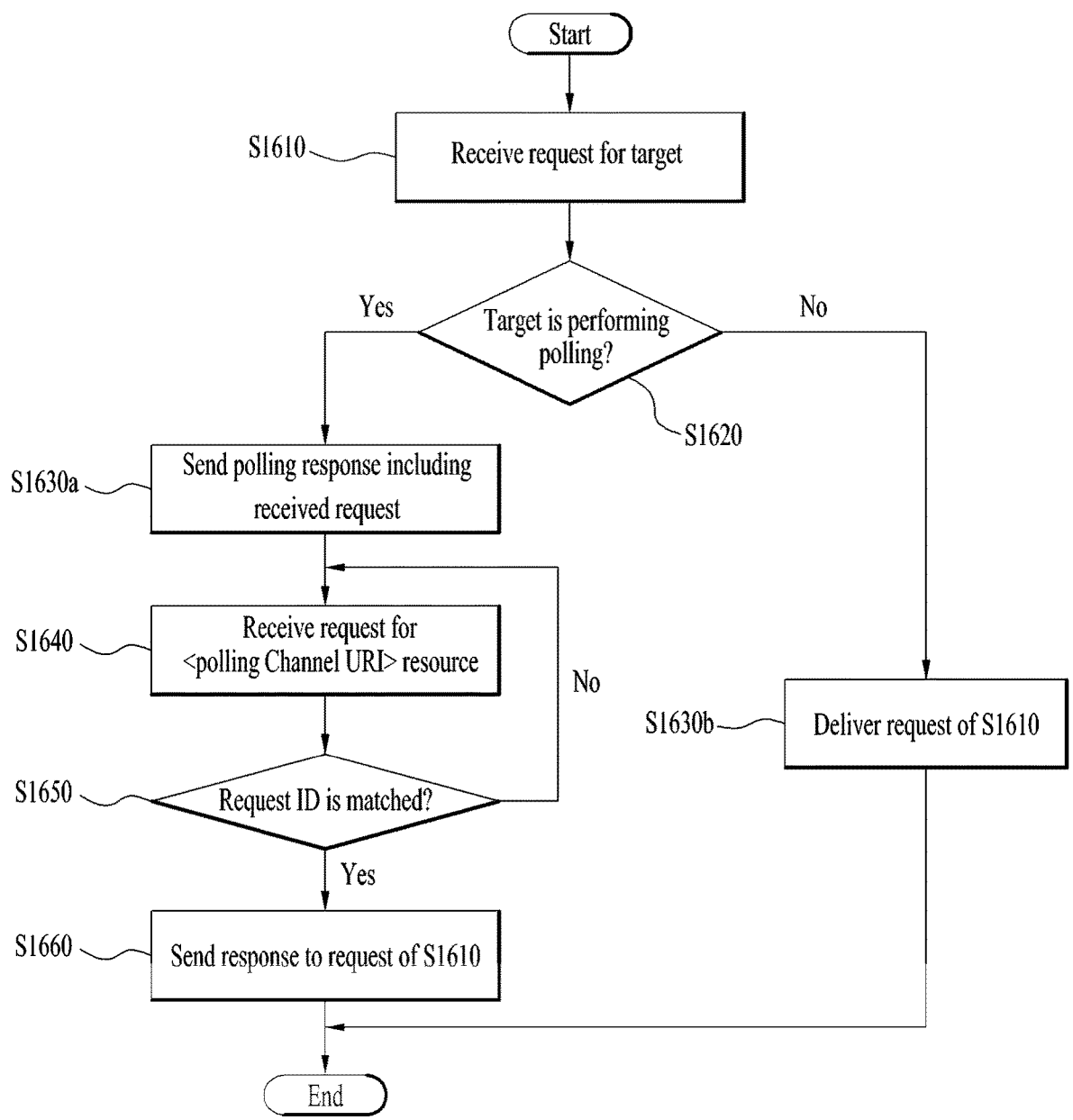
FIG. 16 shows a polling operation according to one embodiment of the present invention.

FIG. 16 shows a procedure performed by the <pollingChannel> hosting CSE (hereinafter named a hosting CSE).

The hosting CSE can receive a request (Request 2) from the originator [S1610]. Since a target that will receive the request is supposed to be designated for the request, the hosting CSE can check whether the target has performed a polling (Request 1) on the hosting CSE [S1620]. If the target fails to perform the polling on the hosting CSE, the hosting CSE can perform a request forwarding of a general push type [S1630-$b$].

Moreover, S1610 and S1620 can be switched to each other in order. In this case, the Request 2 can be sent to the target by being contained in the Response 1 in S1630.

The hosting CSE can send the Request 2 carried on a response (Response) to the polling request (Request 1) of the target [S1630-$a$].

Thereafter, the hosting CSE can receive a request (Request 3) estimated as containing a response message in response to the Request 2 for the <pollingChannelURI> resource from the target [S1640]. The request may indicate such an operation as Notify/Create/Update. The response 2 in response to the Request 2 is contained in a body/payload of the Request 3.

The hosting CSE can check whether Request ID of the Response 2 contained in the Request 3 is identical to that of the Request 2 received in S1610 [S1650]. If not, the hosting CSE can repeat the check until receiving a message having Request ID identical to that of the Request 2. The repetition can be performed for a predetermined time only by referring to a value such as a result expiration timestamp contained in the Request 2.

If confirming that the Request ID of the Request 2 is identical to that of the Response 2 contained in the Request 3, the hosting CSE can send a response (Response 2) to the originator [S1660].

In the following, the aforementioned embodiment of the present invention is further described in general.

If a registree CSE receives a new request contained in a <pollingChannelURI> retrieve response, the registree CSE can send a response as a new request to the <pollingChannel> hosting CSE in response to the received request. The new request contains the response in a Content parameter and is table to target <pollingChannel> resource using a Notify Request.

If the <pollingChannel> hosting CSE receives the Notify request for the <pollingChannelURI> resource, the <pollingChannel> hosting CSE can send the response contained in the Content parameter of the Notify request to an entity having sent an associated request to the <pollingChannel> hosting CSE. The associated request is the request that the <pollingChannel> hosting CSE received and forwarded to the registree CSE through a polling channel. Namely, the associated request corresponds to the above-mentioned received request. The association shall be done by matching the Request Identifier parameter of the request delivered in <pollingChannelURI> Retrieve response and the Request Identifier parameter of the response delivered in the Content parameter in a <pollingChannelURI> Notify request. Namely, as described above, if the two Request Identifiers are matched, the <pollingChannel> hosting CSE can confirm that the response to the request delivered in the <pollingChannelURI> retrieve response was received from the registree CSE.

Figure 17:
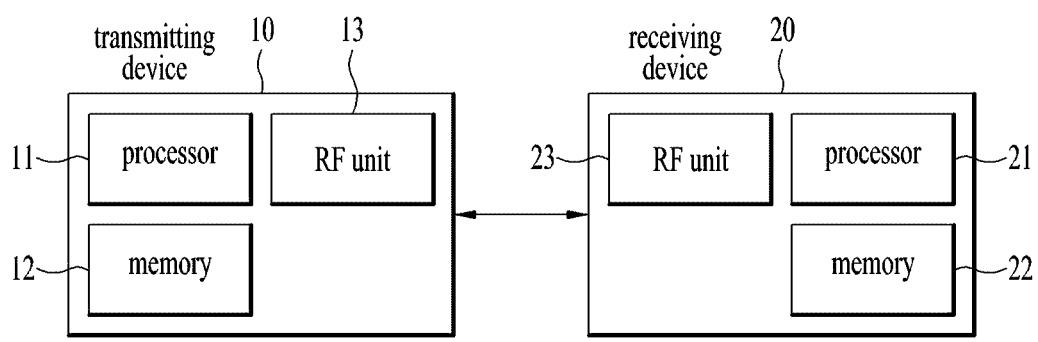
FIG. 17 is a block diagram of a device configured to implement embodiment(s) of the present invention.

FIG. 17 is a block diagram of a transmitting device 10 and a receiving device 20 configured to implement exemplary embodiments of the present invention. Referring to FIG. 17, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

What is claimed is:

1. A method of processing a request message through a polling channel in a wireless communication system, the method performed by a first device, the method comprising:
receiving, from a second device, a retrieve request to retrieve a polling channel uniform resource identifier (URI) resource, wherein the polling channel URI resource is a child resource of a polling channel resource created on the first device;
receiving, from a third device, a first request, wherein the first request is requested to the second device by the third device;
transmitting, to the second device, a retrieve response including the first request based on the polling channel URI resource, wherein the retrieve response corresponds to the retrieve request;
receiving, from the second device, a notify request including a first response corresponding to the first request;
checking that a request identifier of the first response included in the notify request, is identical to a request identifier of the first request included in the retrieve response; and
transmitting, to the third device, the first response based on the request identifier of the first response included in the notify request being identical to the request identifier of the first request included in the retrieve response.

2. The method of claim 1, wherein the notify request is configured to target the polling channel URI resource.

3. The method of claim 2, wherein the polling channel resource is created by the first device based on a request of the second device.

4. The method of claim 3, further comprising declining the notify request based on that the second device did not create the polling channel resource hosted by the first device.

5. The method of claim 2, further comprising checking whether the second device has created the polling channel resource hosted by the first device.

6. The method of claim 1, wherein based on a timestamp parameter being included in the first request received from the third device, the first response is transmitted within a time corresponding to the timestamp parameter.

7. An apparatus configured to process a request message through a polling channel in a wireless communication system, the apparatus comprising:
a radio frequency (RF) unit; and
a processor configured to control the RF unit,
wherein the processor is further configured to:
receive, from a second device, a retrieve request to retrieve a polling channel uniform resource identifier (URI) resource, wherein the polling channel URI resource is a child resource of a polling channel resource created on the first device,
receive, from a third device, a first request, wherein the first request is requested to the second device by the third device,
transmit, to the second device, a retrieve response including the first request based on the polling channel URI resource, wherein the retrieve response corresponds to the retrieve request,
receive, from the second device, a notify request including a first response corresponding to the first request,
check that a request identifier of the first response included in the notify request, is identical to a request identifier of the first request included in the retrieve response, and
transmit the first response to the third device based on the request identifier of the first response included in the notify request being identical to the request identifier of the first request included in the retrieve response.

8. The apparatus of claim 7, wherein the notify request is configured to target the polling channel URI resource.

9. The apparatus of claim 8, wherein the polling channel resource is created by the first device based on a request of the second device.

10. The apparatus of claim 8, wherein the processor is configured to check whether the second device has created the polling channel resource hosted by the first device.

11. The apparatus of claim 10, wherein the processor is configured to decline the notify request based on that the second device did not create the polling channel resource hosted by the first device.

12. The apparatus of claim 7, wherein based on a timestamp parameter being included in the first request received from the third device, the first response is transmitted within a time corresponding to the timestamp parameter.

* * * * *